United States Patent Office 3,480,336
Patented Nov. 25, 1969

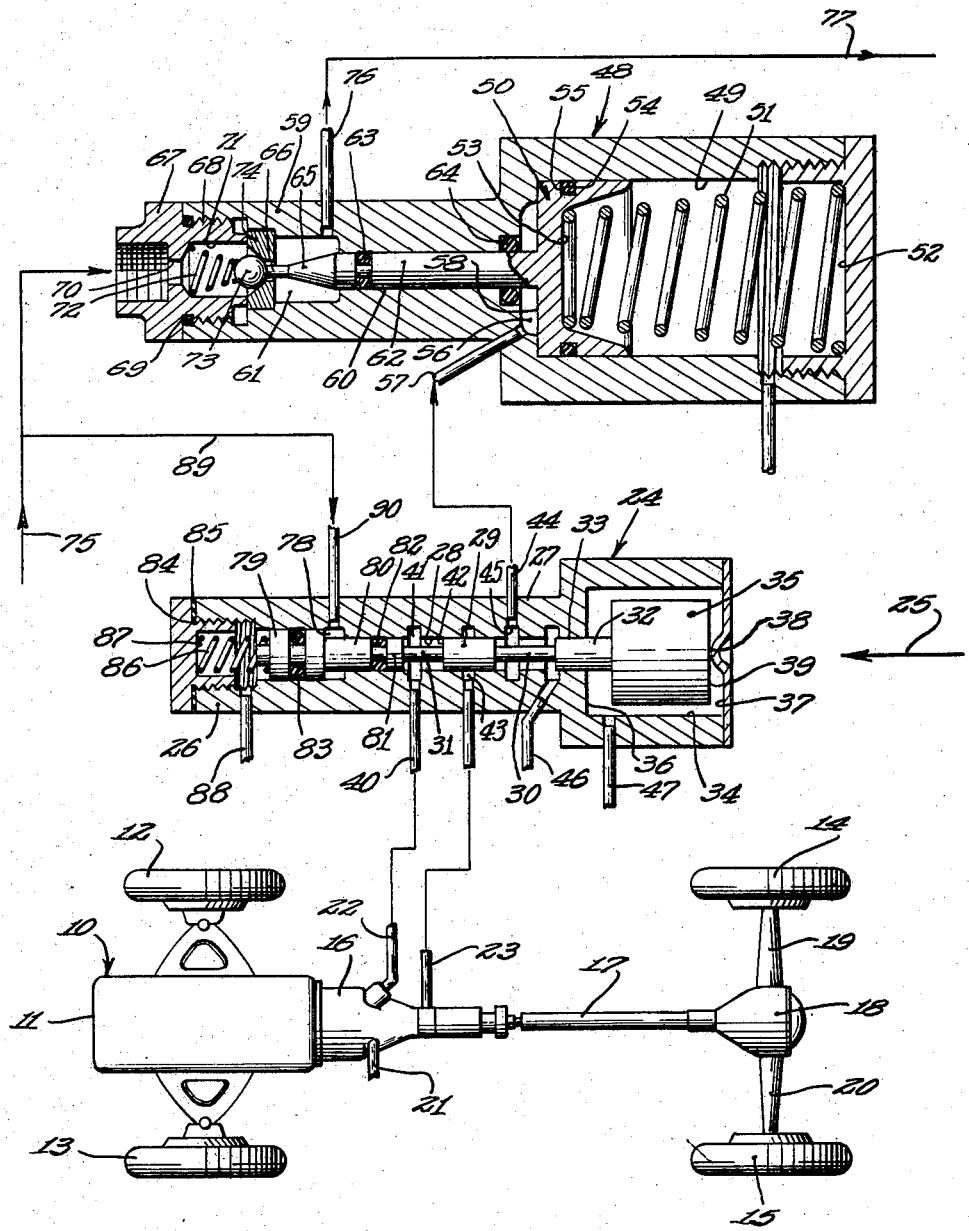

3,480,336
HYDRAULIC ACTUATED SKID CONTROL DEVICE
Hubert M. Clark and Gilbert H. Drutchas, Birmingham, Mich., assignors to TRW, Inc., Cleveland, Ohio, a corporation of Ohio
Filed Nov. 27, 1967, Ser. No. 685,885
Int. Cl. B60t 8/06
U.S. Cl. 303—21                              12 Claims

ABSTRACT OF THE DISCLOSURE

A wheel acceleration control device having means for sensing the linear acceleration of the vehicle and comparing the sensed linear acceleration with the angular acceleration of the vehicle wheels. Should the deceleration rates so sensed deviate beyond permissible limits, the sensing device enables an actuation mechanism for controlling the rate of acceleration of the vehicle wheels, in particular, an anti-skid brake device utilizing transmission hydraulic governor pressure as an indicator of wheel deceleration and utilizing said governor pressure to resist the inertial motion of a linear acceleration mass. Should the governor pressure drop more rapidly than desirable, indicating wheel lock, the linear acceleration mass overcomes the governor pressure and opens the transmission system pressure directly to a fluid actuator for closing off the normally open coupling between the master brake cylinder and the wheel brake motor means.

BACKGROUND OF THE INVENTION

Field of the invention

The field of art to which this invention pertains is a wheel acceleration control system and in particular an anti-skid brake system utilizing means for controlling the deceleration of the braked wheels of a vehicle in keeping with the linear deceleration of the vehicle to avoid wheel lock or skid conditions.

SUMMARY

It is an important feature of the present invention to provide an improved means for controlling the acceleration of vehicle wheels in keeping with the acceleration of the vehicle, itself.

It is also an important feature of the present invention to provide a wheel acceleration control means utilizing a single fluid source both as the acceleration sensing device and as the source means for actuating a wheel acceleration control mechanism.

It is an important object of the present invention to provide an anti-skid brake control system for more effectively controlling the angular deceleration of the brake vehicle wheels in accordance with the linear deceleration of the vehicle.

It is also an object of the present invention to provide an anti-skid brake control system utilizing transmission fluid pressure for sensing the angular deceleration of the vehicle wheels and for actuating a brake release valve when the angular wheel deceleration exceeds the linear vehicle deceleration.

It is another object of this invention to provide an anti-skid brake control device which utilizes transmission governor pressure as a wheel deceleration sensor and which utilizes a piston means for comparing the governor pressure against the inertial movement of a linear acceleration mass and which triggers a valve actuator for releasing the wheel brakes when the governor pressure falls below that required to sustain the inertial movement of the linear acceleration mass.

It is an additional object of this invention to provide an anti-skid brake system of the type described above wherein means are provided to lock out the actuation of the linear acceleration mass in the absence of brake pressure being applied to the master brake cylinder.

It is also an object of this invention to provide an anti-skid brake system of the type described above which utilizes the transmission governor pressure as a wheel acceleration sensing means and which utilizes the transmission system pressure as an actuation force for closing off the flow of brake fluid to the braking wheels when the angular deceleration of the vehicle braked wheels exceeds a given relationship to the linear deceleration of the vehicle.

These and other objects, features and advantages of the present invention will be understood in greater detail from the following description and the associated drawings wherein reference numerals are utilized in designating an illustrative embodiment.

BRIEF DESCRIPTION OF THE DRAWING

The single sheet of drawings in the present application shows schematically a vehicle transmission having a governor pressure outlet and a system pressure outlet, a deceleration sensor including a linear acceleration mass and a piston for comparing the linear acceleration to the angular acceleration of the vehicle wheels as determined by the transmission governor pressure, and which also shows a hydraulic brake release actuator for responding to an excessive wheel deceleration to release the braked wheels until the desired relationship between wheel deceleration and vehicle deceleration is restored.

DESCRIPTION OF THE PREFERRED EMBODIMENT

In the specification and in the claims herein, the term "acceleration" is used as a generic term and intended to include both acceleration and deceleration, deceleration being negative acceleration and hence within the scope of the generic term "acceleration."

A vehicle according to the present invention may take the form, for instance, of an automobile 10 having a standard internal combustion engine 11, a pair of front wheels 12 and 13 and a pair of rear wheels 14 and 15. An automatic transmission 16 is driven by the engine 11 and coupled through a drive shaft 17 to a rear wheel differential 18. The rear wheels 14 and 15 are driven from the differential through rear axles 19 and 20, respectively.

The transmission 16 has an outlet 21 which may be connected to a sump and further outlets 22 and 23 which are utilized to perform the sensing and actuation functions of the present invention.

In particular, the outlet 22 is taken from a governor pump, the pressure in the governor circuit is regulated usually by a centrifugal governor at a pressure level that varies with the square of the speed of the drive shaft and thus of the rear wheels. The pressure at the output 23 is the usual transmission pressure and is provided by a pump mounted in the front of the transmission, and its pressure level is maintained by a regulating valve in the system at approximately 125 p.s.i.

The sensing device of the present invention includes a housing 24 which may be mounted on the vehicle body and orientated in accordance with the arrow 25 so that vehicle forward direction is in the direction of the arrow.

The housing 24 consists of two functional portions, a lockout portion 26 and a sensor comparator portion 27. Both of these portions have an inner cavity or chamber formed of various diameters to perform the various required functions.

The sensor portion 27 has a first diameter chamber 28 formed to provide the acceleration comparison necessary to determine when the wheel angular acceleration exceeds a given relationship with the vehicle linear deceleration. This comparison is accomplished by establishing fluid pressure associated with the automatic transmission governor pressure against the inertial movement of a linear acceleration mass.

In particular, a piston 29 is slidably mounted within the chamber 28 and is integral with a rod 30 which rod has an extension portion 31 at the forward side of the piston 29.

A further piston 32 is rigidly connected to the rod 30 and is carried within a wall portion 33 of the chamber 28.

A larger cavity 34 is formed at the rearward side of the cavity 28 and contains an inertial mass 35 which is rigidly affixed to the piston 32 and which has an overall length which is substantially less than the overall length of the chamber 34 as measured between a forward end wall 36 and a rearward end wall 37. Accordingly, the inertial mass 35 is allowed to slide to and fro within the chamber 34 and within the limits provided by the end walls 36 and 37. It is noted that the end wall 37 has a convex stop portion 38 which contacts the rear face 39 of the inertial mass 35 and allows the mass 35 to move freely from the end face with a minimum of resistance.

It is apparent from studying the acceleration sensor, that the mass 35 would have a tendency to move forward within the cavity 34 during linear deceleration of the vehicle. Accordingly, if the tendency of the mass to move forward in accordance with vehicle linear deceleration is to be compared with vehicle angular deceleration, the fluid governor pressure from the transmission must be connected in such a way as to oppose the motion of the inertial mass 35.

This is accomplished by connecting the outlet 22 of the transmission 16 through a fluid conduit 40 to a cavity 41 formed at an enlarged radial wall of the cavity 28. The fluid entering the cavity 41 then is allowed to act against a surface 42 of the piston 29 and thereby to counteract the tendency of the inertial mass 35 to move forward within its cavity 34. Accordingly, the governor pressure which is proportional to the square of the wheel speed is balanced against the mechanical pressure of the inertial mass during a sudden stopping of the vehicle. It is also apparent that should wheel lock occur, the governor pressure will suddenly drop thereby reducing the resistance to the forward sliding of the inertial mass 35, and the forward force on the mass 35 will overcome the brake fluid pressure and move the mass in a forward direction within the cavity 34. Of course, the piston 29 will likewise move forwardly within the cavity 28.

It is the forward movement of the piston 29 in response to a decrease in governor pressure that is utilized to actuate a valve means for releasing the pressure on the rear wheel brakes to restore the deceleration relationship between the braked wheels and the vehicle itself.

In particular, the output 23 of the transmission, which carries the system pressure at approximately 125 p.s.i., is coupled to a radially enlarged cavity 43, and an outlet conduit 44 is coupled from a radially enlarged cavity 45.

In the position shown in the drawing, the piston 29 effectively blocks the communication of the system pressure at the cavity 43 with the outlet 44 at the cavity 45. However, should the governor pressure decrease due to a wheel lock condition, the inertial mass 35 will tend to move forwardly within the cavity 34 thereby carrying the piston 29 forwardly within the cavity 28 and unblocking the communication of the cavity 43 with the cavity 45. Accordingly, the forward movement of the piston 29 effectively opens the valve which communicates the system pressure to the outlet 44 and hence to a mechanism for releasing the braked wheels. It is noted that outlets 46 and 47 are connected from the cavity areas 45 and 34 and may be connected to a sump or other fluid return line to relieve pressure within the respective cavities due to the movement of the piston therein.

The actuating mechanism which is utilized to release the rear brake wheels and thereby restore the angular to linear deceleration relationship, includes a housing 48 which has an internal cavity 49 and which has a piston 50 slidably movable within the cavity and biased in a forwardly direction by a coil spring 51. The coil spring 51 is seated at a rear wall 52 and at the opposite end thereof at the rear wall 53 of the piston 50.

An O-ring 54 is mounted within a recess 55 formed within the exterior surface of the piston 50 and in the absence of other forces being applicable, the piston 50 is allowed to slide to and fro within the cavity 49.

A second cavity 56 is defined forwardly of the piston 50, and an inlet conduit 57 is connected directly thereto. The inlet conduit 57 is coupled to the outlet conduit 44 associated with the sensor device, and, accordingly, fluid pressure from the transmission outlet 23 will be coupled directly to the inlet 57 and hence to the cavity 56 when the piston 29 is moved forwardly within its cavity 28. Such fluid pressure will then act against the front face 58 of the piston 50 and cause the piston to move rearwardly within the cavity 49 against the opposing biasing pressure of the spring 51.

The housing 48 has a forward portion 59. The forward portion 59 has a bore 60 of a first diameter and a second bore 61 of a second and larger diameter. A piston 62 is slidably disposed within the first bore 60 and is rigidly affixed to the piston 50. A pair of O-rings 63 and 64 are provided about the piston 62 to assure that fluid pressure from the cavity 56 does not pass forwardly of the bore 60 into the cavity or bore 61.

The forward end of the piston 62 has a tapered nose portion 65 and a rod-like contact member 66 which is utilized to open and close the brake release valve of the present invention.

A standard fitting 67 is threaded as at 68 into the end of the forward housing portion, and seals are provided as at 69 to assure a fluid type of seat. The fitting 67 has a reduced diameter portion 70 and an enlarged diameter portion 71 in which is seated a coil spring 72 for holding a ball valve 73 into a closed position at a valve seat 74.

When the rod or pin 66 associated with the piston 62 is in the position shown in the drawing, the ball 73 is lifted off the seat 74 against the biasing tendency of the coil spring 72 thereby communicating the inlet 70 with the enlarged cavity 61 formed within the forward housing portion of the actuator. When, however, fluid pressure passes from the transmission system outlet 23 through the sensor housing 24 into the cavity 56, the piston 50 is moved rearwardly within the cavity 49 and the pin 66 is retracted from its contact position with the ball 73, thereby allowing the ball to be seated against the valve seat 74 and hence, closing off the inlet 70 from the cavity 61.

The arrows shown in the drawings indicate the flow of brake fluid from the master brake cylinder beginning at the arrow indicated by the reference numeral 75. Fluid from the master brake cylinder enters the inlet 70 and is either passed or blocked by the ball valve 73 in its passage to an outlet conduit 76 and hence to the rear brake wheels as indicated by an arrow 77. Accordingly, the operation of the piston 62–50 allows either the communication or the blocking of communication from the master cylinder to the rear wheel brakes thereby controlling the application of the brakes and hence the deceleration of the vehicle wheels. For instance, when the piston 62 is retracted toward the rear, fluid is withdrawn from the line 61 which, in turn, withdraws fluid from the conduit 76 and reduces pressure in the rear brakes of the vehicle. Furthermore, in accordance with the balancing of the inertial movement of the mass 35 against the governor pressure at the cavity 28, the closing or opening of the ball valve 73 will be in accordance with the monitoring of the linear and angular deceleration of the vehicle and in accordance with the tendency of the sensor to maintain a fixed relationship between the two decelerations, thereby avoiding wheel lock and skid.

A sensor lockout device is employed in the present invention and is mounted simply within the forward portion of the housing 24. In particular, the housing 24 is provided with a forward cavity 78 in which rides a piston 79. The piston has a rearward portion 80 which slides within the cavity 28 and which has a head portion 81 for contacting the extension portion 31 of the piston 29. An O-ring 82 is provided between the portions 80 and 81 of the wheel lock piston to prevent the commingling of transmission fluid within the cavity 28 with brake fluid within the cavity 78. Additional seals may be provided as at 83.

The housing 24 is fitted with an end plug 84 and is sealed as at 85. A coil spring 86 is seated against an end wall 87 and at the opposite end against the radially enlarged portion 79 of the lockout piston. A sump connection is provided at 88.

As shown by the arrows, the master brake cylinder outlet is coupled by means of a hydraulic line 89 to an inlet 90 and hence to the cavity 78 of the lockout portion of the sensor housing 24. Until brake pressure is applied and hydraulic pressure within the cavity 78 builds up to the required minimum, the lockout piston 79 is biased in a rearward direction and retains the inertial mass 35 from moving forwardly and hence from opening the valve connection 43.

When, however, brake pressure has been applied and is received within the cavity 78, such pressure acts against the surface of the lockout piston 79 and moves the piston against the biasing force of the spring 86 in a forward vehicle direction thereby relieving the piston 29 and the inertial mass 35 to move forwardly in accordance with the balance provided between the inertia of the mass 35 and the governor fluid pressure as received within the cavity 28.

It will be apparent to those versed in the art that various modifications and combinations of the features of this invention may be accomplished without departing from the spirit of the disclosure set forth herein. For instance, a separate pump driven by the vehicle engine could be used to supply the fluid at pressure corresponding to that at the transmission outlet 23 and a pump driven by the vehicle drive shaft 17 could be used to supply fluid at a pressure corresponding to that in transmission outlet 22 (governor pressure).

We claim:
1. In a vehicle having wheels for moving along a surface, a wheel skid control device comprising:
 a housing having a chamber and movable surface disposed generally transversely of said chamber, an inertial mass movably mounted along the principal axis of movement of the vehicle, and
 having means for acting in one direction against said movable surface in response to acceleration of the vehicle,
 fluid system means for generating a fluid pressure which is proportional to the rotational speed of said wheels and having means for causing said fluid pressure to urge said movable surface in a direction opposite to said one direction of said inertial mass, and
 means for controlling the acceleration of the vehicle wheels in response to a predetermined movement of said inertial mass.

2. In a vehicle having wheels for moving along a surface, a wheel skid control device comprising:
 an inertial mass,
 support means for mounting said inertial mass on the vehicle to be freely movable along the principal axis of movement thereof in response to the acceleration of the vehicle,
 a housing having a chamber and a fluid movable piston mounted in said chamber,
 one side of said piston being coupled to said inertial mass,
 fluid system means for generating a fluid pressure which is proportional to the rotational speed of said wheels,
 the other side of said piston being coupled to said fluid system means,
 said piston being guided in said chamber to be movably responsive to said fluid pressure,
 whereby fluid pressure from said fluid system means acts through said piston to resist movement of said inertial mass during acceleration of said vehicle, and means responsive to movement of said inertial mass to control the acceleration of the vehicle wheels.

3. A wheel skid control device in accordance with claim 1 wherein said fluid system means comprises a transmission hydraulic system.

4. A wheel skid control device in accordance with claim 3 wherein said transmission hydraulic system has a governor circuit and wherein fluid pressure from said governor circuit is the fluid pressure caused to act against said movable surface.

5. In a vehicle having wheels for moving along a surface, and hydraulic braking means including a master brake cylinder and wheel brake motor means and a hydraulic fluid link coupling said master cylinder to said wheel brake motor means, an anti-skid brake control device comprising:
 a housing having a chamber and having a weighted piston slidably movable therein in the forward vehicle direction in response to deceleration of the vehicle,
 fluid system means for generating a fluid pressure which is proportional to the rotational speed of said wheels and for coupling said fluid pressure to the forward vehicle side of said weighted piston to bias the same in a rearward vehicle direction,
whereby said fluid pressure tends to counterbalance the forward movement of said weighted piston during vehicle deceleration, and
 means for controlling the application of said braking means in response to a predetermined motion of said piston.

6. An anti-skid brake control device in accordance with claim 5 wherein a lockout device is provided to prevent slidable forward vehicle movement of said weighted piston in the absence of actuation of said master brake cylinder, said lockout device comprising a housing having a lockout chamber and a lockout piston slidably disposed therein, said lockout piston being coupled to said weighted piston, means biasing said lockout piston in a direction for holding said weighted piston in a rearward vehicle direction, hydraulic brake fluid from said master brake cylinder being coupled to said lockout chamber and acting on said lockout piston in a direction for overcoming said biasing means, whereby actuation of said master brake cylinder moves said lockout piston against said biasing means, thereby releasing said weighted piston to move in a forward vehicle direction in response to vehicle deceleration.

7. An anti-skid brake control device in accordance with claim 5 wherein said means for controlling the application of said braking means comprises:
 first valve means in said hydraulic fluid line for opening and closing the flow of fluid from said master cylinder to said brake motor means,
 a hydraulic actuator including an actuator housing, an actuator chamber and an actuator piston slidably movable therein,
 said actuator piston being coupled to said first valve means for opening and closing the same,
 a source of fluid pressure,
 conduit means coupling said source of fluid pressure to a side of said actuator piston for moving the same in a direction for closing said first valve means, means biasing said actuator piston in a direction for opening said first valve means, second valve means operably disposed within said conduit means, and said second valve means being opened and closed by the movement of said weighted piston.

8. An anti-skid brake control device in accordance with claim 7 wherein said fluid system comprises a vehicle transmission having a fluid governor circuit and wherein the fluid pressure tending to counterbalance the forward movement of said weighted piston comprises fluid pressure from said governor circuit.

9. An anti-skid brake control device in accordance with claim 8 wherein said source of fluid pressure comprises the system pressure of said vehicle transmission.

10. In a vehicle having wheels for moving along a surface, hydraulic braking means including a master cylinder, wheel brake motor means, and a hydraulic brake line coupling said master cylinder and said wheel brake motor means, and having a transmission, said transmission having a governor circuit outlet and a system outlet, an anti-skid brake control comprising:

a housing having a chamber and having a weighted piston slidably movable therein in the forward vehicle direction in response to deceleration of the vehicle, means coupling said governor circuit outlet to said chamber at a point to urge said piston in the rearward vehicle direction, first valve means having a valve actuator for opening and closing the flow of fluid from said master cylinder to said brake motor means, conduit means coupling said system outlet to said valve actuator, said valve actuator being operable by fluid pressure from said system outlet, second valve means operably disposed within said conduit means for controlling the flow of transmission system pressure to said valve actuator, and said second valve means being operated by a predetermined movement of said weighted piston.

11. An anti-skid brake control in accordance with claim 10 wherein biasing means are provided to urge said weighted piston into a position for closing said second valve means and wherein means are coupled to said master cylinder to overcome said biasing means upon actuation of the same.

12. An anti-skid brake control in accordance with claim 11 wherein said transmission system pressure is coupled to and from said chamber and wherein said second valve means comprises said weighted piston being movable into and out of slidable engagement with the point of coupling of said system pressure to said chamber.

References Cited

UNITED STATES PATENTS 3,286,734 11/1966 Hartshorne _____ 303—21 XR
3,322,471 5/1967 Faiver et al. _____ 303—21

MILTON BUCHLER, Primary Examiner

J. J. McLAUGHLIN, Jr., Assistant Examiner

U.S. Cl. X.R.

188—181; 192—4; 303—68